United States Patent [19]

Lewison

[11] 4,139,065
[45] Feb. 13, 1979

[54] TRANSPORT WHEEL ASSEMBLY FOR IMPLEMENTS

[75] Inventor: Howard L. Lewison, Hutchinson, Minn.

[73] Assignee: Dynamics Corporation of America, Greenwich, Conn.

[21] Appl. No.: 837,307

[22] Filed: Sep. 28, 1977

[51] Int. Cl.² ............................................. A01B 63/22
[52] U.S. Cl. .................................... 172/400; 172/413; 172/421; 172/466; 280/43.16; 280/43.23
[58] Field of Search .............. 172/240, 311, 400, 406, 172/408, 410, 411, 412, 413, 421, 456, 466; 280/6.11, 43.13, 43.16, 43.23

[56] References Cited

U.S. PATENT DOCUMENTS

| 625,323 | 5/1899 | Craggs et al. | 172/400 X |
|---|---|---|---|
| 2,641,886 | 6/1953 | Graham | 172/311 |
| 2,734,437 | 2/1956 | Erling | 172/413 |
| 3,090,449 | 5/1963 | Ward | 172/413 X |
| 3,240,506 | 3/1966 | McMullen | 280/43.23 |
| 3,288,315 | 11/1966 | Bigden | 280/43.23 X |
| 3,578,352 | 5/1971 | Heine | 280/43.23 |
| 3,913,683 | 10/1975 | Olsson et al. | 172/240 |
| 4,063,745 | 12/1977 | Olson | 280/43.23 |

Primary Examiner—Richard T. Stouffer
Attorney, Agent, or Firm—Schroeder, Siegfried, Ryan, Vidas & Steffey

[57] ABSTRACT

This invention relates to a transport wheel assembly for a tillage type agricultural implement having at least two pairs of ground support wheels mounted on the frame section of the implement. Each wheel of the pair is journaled in a separate axle mounted on the end of a pivot arm with the pivot arms being mounted in spaced shafts journaled on the implement frame. The shafts are separated longitudinally of the implement frame or across the width of the same to space the wheels longitudinally apart, and they are also separated in a fore and aft direction of the implement frame. The shafts of each pair are tied together through a hydraulic actuator which acts as a linkage to transmit motion from one wheel to the other when the implement traverses uneven terrain. The actuator in one position pivots the wheels in close proximity in the fore and aft direction for stability in turns and raising the implement and hence the ground working tools above ground level for transport. In the opposite position of the actuator, the implement frame is lowered for working and the wheels are separated in the fore and aft direction to a wide extent for greater stability in traversing uneven terrain. In the transport position, a strap ties the actuator to a fixed position for safety purposes. Stops on the frame limit movement of the transport wheels for stability purposes. On wing sections of the implement, the transport wheel assembly includes an adjustment of the wheel position for depth adjustment of the tools.

12 Claims, 7 Drawing Figures

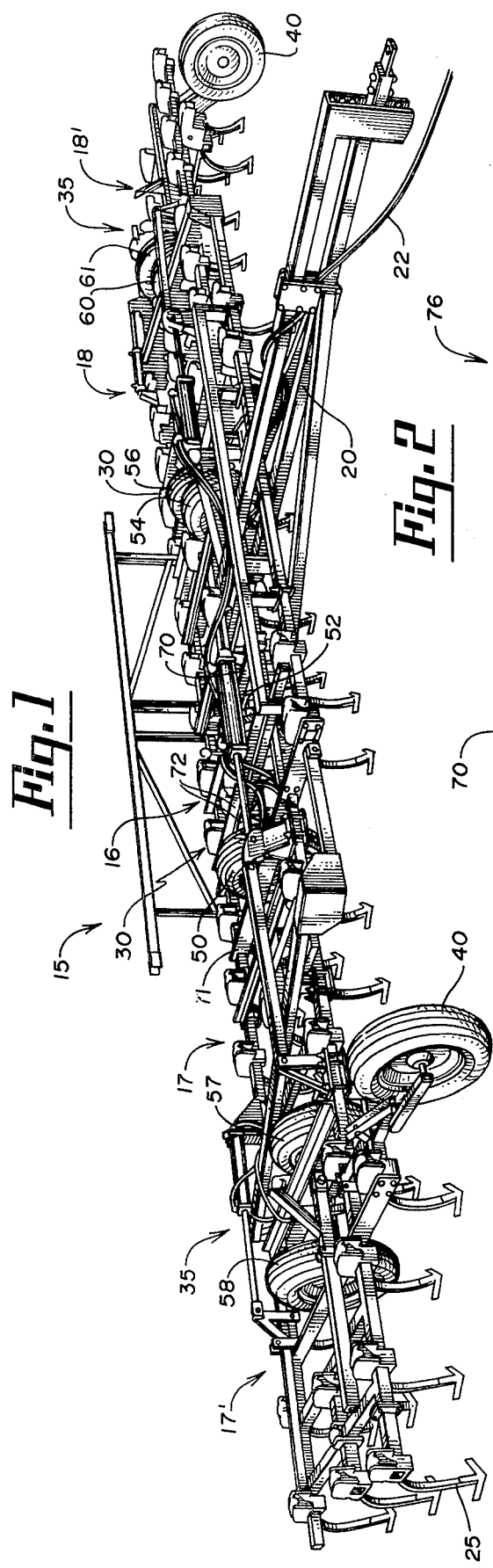
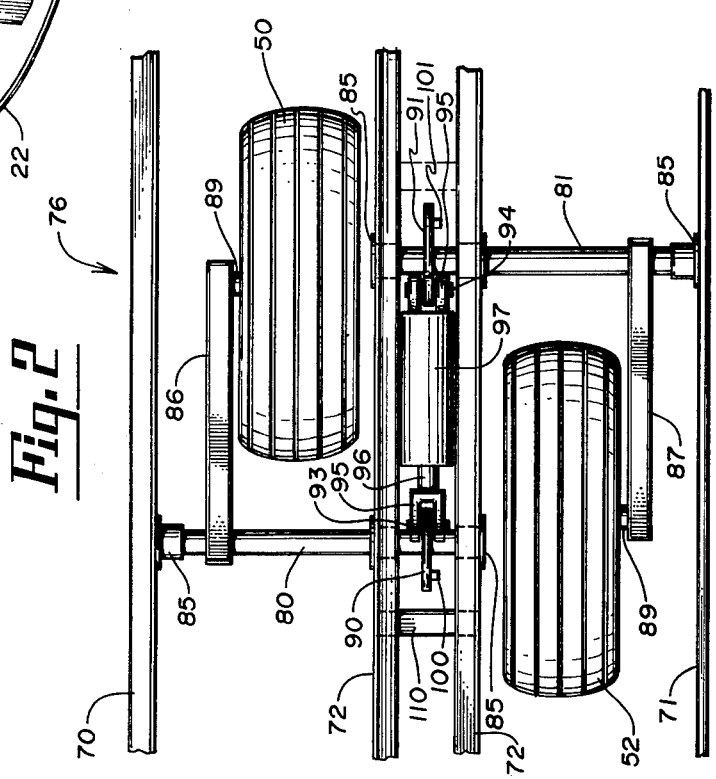
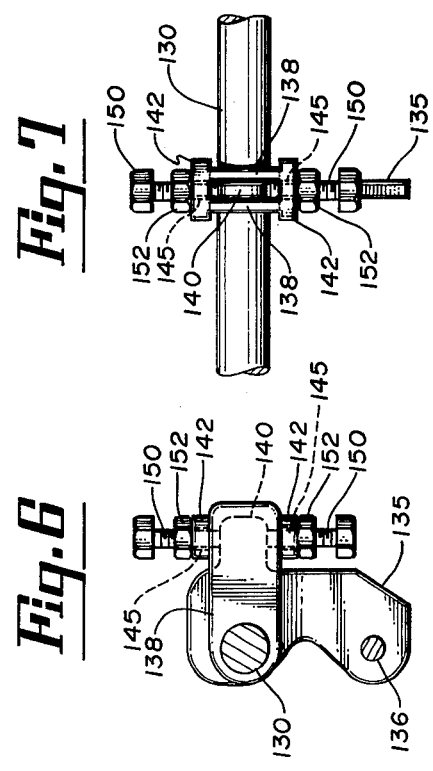

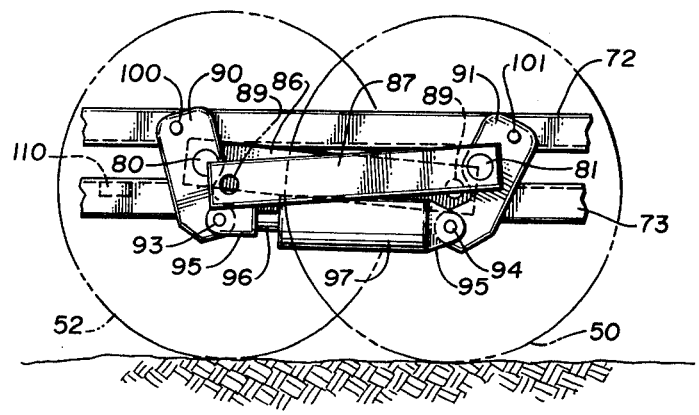
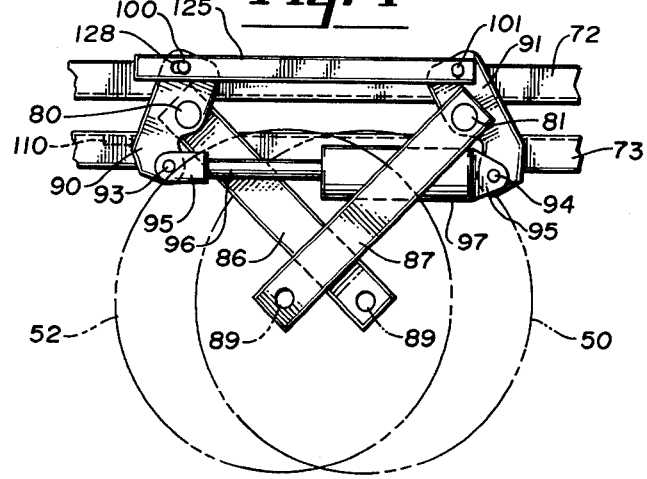
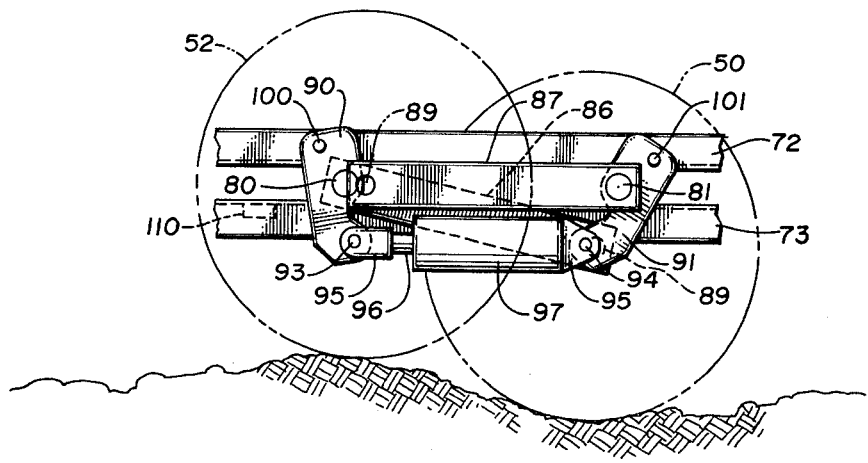

TRANSPORT WHEEL ASSEMBLY FOR IMPLEMENTS

BACKGROUND OF INVENTION

1. Field of Invention

This invention relates generally to transport wheel assemblies for implements adapted for towing and more particularly to an improved wheel assembly for tillage type implements with level action depth control of tools mounted thereon when traveling over uneven terrain and for stability in both working and transport positions.

2. Prior Art

Agricultural type tillage implements are normally designed with substantial widths or lengths transverse to the normal direction of working of the implement for the purpose of covering fairly wide widths in the working of a field. Such implements, because of the increased width of the same, have employed foldable wing sections to enable a reduction in width of the overall implement for transport purposes. The transport wheel assembly for such implements have the normal requirement of positioning the implement relative to the ground surface for proper working depth of the tools mounted thereon and raising of the implement relative to the ground surface for transport purposes. One of the problems encountered in the operation of such an implement is the maintenance of a uniform level of working tool depth into the ground as the implement traverses uneven terrain. This is particularly true in connection with terrain having rocks or bumps therein which will displace the level of the implement as it is being towed in a working mode of operation changing the relationship of the working tools with respect to the ground.

In the past, attempts to maintain the implement operating at a uniform depth of working tool over uneven terrain has been met through the use of a "walking beam" type of transport assembly. In this arrangement, the stablizing or support wheels are mounted in tandem pairs on a common rocker arm so that one wheel of the pair will be free to move up or down to follow the terrain. An example of such a construction is shown in the Erling U.S. Pat. No. 2,734,437. Such a transport wheel arrangement has the problem of creating wheel drag during turns, and like the use of a single wheel, does not provide for uniform distribution of weight throughout the extent of a wide implement. While the walking beam type wheel assembly does provide greater stability than a single wheel support and better traverse over uneven terrain, it still results in angular movement or tilt of the implement relative to the ground when traveling over extremely rough terrain.

SUMMARY OF PRESENT INVENTION

The present invention is directed to a transport wheel assembly for tillage type implements wherein the transport wheels are mounted in pairs on the implement frame. Each wheel of a pair is mounted on a separate axle and spaced from the other in the pair along the width of the implement for increased stability and load distribution as well as being spaced in the direction of movement for greater stability over rough terrain. The individual pairs of wheels have each wheel of the pair individually mounted on a pivoted arm and supported and journaled on a separate shaft. The shafts are tied together through a hydraulic actuator which transmits shaft movement of one shaft to the other for better floatation of the wheels and more uniform level control. In addition, the single actuator may be used to elevate the implement for transport purposes and lower the same for uniform working purposes.

The improved transport wheel assembly provides a means for locking the transport assembly in an elevated position for transport providing greater safety and eliminating load on the actuator. Similarly, when such wheel assemblies are used on wing sections, an adjustment is made to adjust the level of the wheels with respect to the main section of the implement for uniform depth control. With the improved transport wheel assembly, the pairs of wheels will be mounted in the transport position with a narrow center-to-center relationship eliminating wheel drag during sharp turns which is present in the conventional walking beam type axle arrangement. The wide center-to-center relationship of the wheel axles when the transport wheel assembly is in the working position provides for greater stability when needed and permits greater width than is available in present walking beam type arrangements for increased stability. The lateral or width spacing of the pairs of wheels is important to tillage type equipment to ensure that the wheel tracks can be followed by the soil working tools to remove compacted areas created by each wheel. Further, this spacing permits greater floatation in the field working position and better distribution of the weight carrying points of the frame of the implement. The single hydraulic actuator serves to raise and lower the transport wheel pairs between transport and working positions and also serves as a link to produce equal load distribution for each wheel as they pass over uneven terrain. It also enables an accurate gauge of the depth of operation of the tillage tools attached to the implement.

BRIEF DESCRIPTION OF THE DRAWINGS

FIG. 1 is a perspective view of a tillage type implement showing the transport wheel assembly of the present invention;

FIG. 2 is a fragmentary plan view of the implement of FIG. 1 showing one pair of the transport wheels on one side of the implement;

FIG. 3 is a fragmentary elevation view of a pair of transport wheels of FIG. 2 in a ground working position;

FIG. 4 is a fragmentary elevation view similar to FIG. 3 showing the pair of transport wheels in a transport position and incorporating a transport lock;

FIG. 5 is a schematic elevation view of one pair of the transport wheels traversing uneven terrain;

FIG. 6 is a schematic side elevation view of a linkage for one wheel of a pair of transport wheels on a wing section of the implement showing the wing axle depth adjustment principal; and, FIG. 7 is a end view of the structure of FIG. 6 showing the wing axle depth adjustment principal.

PREFERRED EMBODIMENT

FIG. 1 shows a tillage type implement generally at 10. It is designed to be towed by a draft vehicle, such as a tractor. The implement includes a frame, indicated generally at 15, having a center section 16 and main wing sections 17 and 18 pivotally mounted on the main or center section 16 and with outboard wing sections 17' and 18' pivotally mounted on the main wing sections 17 and 18 respectively. The entire frame section is coupled through a tongue or draw bar 20 adapted to be connected to a tractor with suitable hydraulic lines indicated at 22 extending therefrom and being adapted to be connected to a hydraulic source with suitable control valving thereon (not shown). The frame 15 mounts a plurality of working tillage tools indicated generally at 25, distributed along and throughout the extent of the same. The frame 15 is supported by a transport wheel assembly which includes two pairs of transport wheels indicated generally at 30 on the main section and a single pair of transport wheel sections, indicated generally at 35 on each of the the respective main wing sections 17, 18. In addition thereto, the frame assembly or frame 15 also has connected thereto a pair of forwardly extending stabilizing wheels 40 which add to the stabilization of the wing sections. The present invention is shown in connection to a wing cultivator of the type shown in the Groenke U.S. Pat. No. 3,321,028 entitled FOLDABLE IMPLEMENT MOUNTING. It will be recognized, however, that the invention in the transport wheel assembly may be applied to a cultivator having just a single frame section, as well as foldable type implements.

The port wheel assembly or the two pairs of transport wheels 30 are formed of individual wheels 50, 52 and 54, 56 beneath the main section 16 of the implement with wing transport wheels 35 being formed of individual wheels 57, 58 and 60, 61 supporting the wing sections 17 and 18 respectively. The outboard wing sections 17' and 18' have no wheels mounted thereon. Depending upon the transverse length of the overall implement, a tillage type implement or cultivator of this type may include only a single frame section with transport wheels beneath the same, a main section with wing sections which are unsupported, a main frame section with wing sections which have only a single support wheel thereon, and as in the case of the disclosure of FIG. 1, a main section with dual support wheels and with dual support wheels beneath the inboard wing sections also. Further, there may be two foldable wings on either side of the main section with the outboard wing section having single wheels thereon.

FIG. 2 shows a fragmentary plan view of a portion of the implement disclosing the pair of support wheels 50, 52 for the purpose of disclosing the present invention. As indicated in FIG. 1, two such pairs will be mounted on the main support section of the implement. The frame 16 which is indicated by a plurality of angle bars 70, 71, 72 and 73 mounts a pair of shafts 80, 81 extending between the fore and aft angle bars of the frame. The shafts are suitably journaled in bearing supports 85 welded to sides of the angle bars to journal the same therein. Such shafts are spaced apart across the transverse length of the frame and apart in the fore and aft direction of the frame. The shafts 80, 81 mount lever arms 86, 87 respectively with the end of the respective lever arms opposite the shafts mounting axles, indicated at 88, upon which the support wheels 50, 52 are journaled. The lever arms 86, 87 or pivot arms have a length dimension at least equal to the spacing in the forward direction between the shafts mounted on the frame section to which they are connected. As will be seen in FIGS. 2 and 3, the frame parts 70 and 71 are basically aligned at the same elevation and mount the bearing supports 85 to support one end of the shaft. The frame parts 72 and 73 are pairs of angle irons which are separated in the depth direction of the frame with the shaft passing between the same and with the bearing supports 85 being secured between the upper and lower frame parts 72, 73. Between the pairs upper angle irons 72 and the lower angle irons 73 on the respective shafts there is positioned flange plates 90, 91. These flange plates are secured to the shaft to rotate therewith in the bearing supports 85. The flange plates extend beyond the shafts and have pin members 93, 94 positioned at the lower end of the same. A single hydraulic actuator formed by a cylinder 97 having a shaft 96 extending therefrom is connected between the pins 93, 94 through clevis type connections 95 so that the actuator extremities will pivot on the pins 93, 94. The hydraulic actuator has suitable fluid lines connected to either end of the cylinder for bidirectional operation. The opposite ends of the flange plates 90, 91 from the pins 93, 94 mount a second set of pins 100, 101 respectively, for purposes to be later noted. Further, as will be seen in FIGS. 2, 3, and 4, the frame parts 72 have a stop bar 110 connected therebetween and these stops are provided for each wheel assembly on the main section of the frame.

It will be recognized that the shape of the flange plates and the location of the pins 93, 94 thereon may vary and that the cylinder may be located above the shafts 80, 81 as well as below the shafts 80, 81 as the pins 93, 94. Further, the flange plates 90, 91 which are shown as symmetrical in form, may be shaped differently to provide different clearances between the base and shaft ends of the cylinder.

FIG. 2 shows the transport wheel assembly or the pair of wheels 50, 52 in a working position with the actuator parts 97, 96 being in a retracted position, that is, the shaft extending into the cylinder to a maximum position. It will be recognized that, in the working position, all wheel assemblies on the implement will be in the same position and, the hydraulic actuators will be connected to the source of supply through the conduit lines 72 to the tractor where valving will be adjusted to condition each actuator simultaneously to the retracted position. In this position, as indicated in FIG. 3, the wheel axles will be spaced apart a maximum distance along the fore and aft line of the implement providing increased stability for the implement with the working tools thereon. This wheel spacing in the forward direction or fore and aft direction is approximately equal to the spacing between the shafts mounting the wheels for the raised position of the wheels and less than the spacing between the shafts for the lowered position of the wheels. The lateral or transverse spacing of the wheels in the individual wheel assemblies, due to the positioning of the shafts 80, 81 and the lever arms 86, 87 thereon, will be such as to provide for additional stability along the width of the implement and greater distribution of the stress points on the frame due to the position of the working tools thereon. This lateral spacing of the wheels of each pair is greater than the spacing between the wheels and the wheel axles in the lowered position of the wheels. In traversing uneven terrain during the working position of the wheel assemblies, as a wheel meets a high or low point on the ground or terrain, such as a rock or hole, the wheel encountering the raised or lowered point will move upward or downward respectively through its pivot arm. Thus, in FIG. 5, as wheel 50 in the forward direction meets a depression in the terrain, the pivot arm 86 will move down lowering the wheel 50. This motion will be transmitted through the shaft 80 mounting the pivot arm causing the plate 90 to rotate and urging the shaft 96 of the actuator to move the cylinder 97 and hence, the plate 91, attached to the shaft 81 to pivot the support wheel 52 upward the same distance that wheel 50 moves down. Thus, the frame section of the implement will remain at substantially the same height providing a uniform depth control for the working tools mounted on the frame and distributed along the extent of the same. The reverse movement takes place when a lump or rise in the terrain is encountered.

Whenever it is desired to position the wheel assembly in a transport condition, the hydraulic actuators are energized to cause the cylinder shaft 96 to extend out of the cylinder 97 pivoting the respective shafts 80, 81 which support and hence, the lever arms 86, 87 attached thereto to bring the support wheels 50, 52 to a condition in which the axles are closely aligned with one another and the frame sections are elevated above the ground. It will be understood that all wheel assemblies on the implement will be similarly energized. With the narrow spacing between the axles, there will be less drag caused by the wheels in a sharp turn. In this condition of operation, a temporary transport strap 125 having holes on the extremities of the same is positioned over the pins 100, 101 on the top of the flange plates 90, 91 for each actuator to take the load off the actuator and prevent the wheel assemblies from moving to a working position due to loss in hydraulic pressure in the cylinder. One of the apertures in the transport strap has an enlarged opening 128 therein which permits easy installation of the strap over the pins 100, 101. In the transport position of the wheel assembly, any uneven terrain will cause one of the wheels to move up as the other moves down to maintain a level position of the implement frame. During such a condition the motion from one axle will be transmitted through the actuator and transport strap to the other axle in the manner described in the working condition of the wheel assemblies.

The axle stops 110 on the frame prevent the axles from traveling too far due to wheels dropping into extreme depressions or bouncing too much on a turn. For example, the axle or wheel 50 in FIGS. 2, 3, and 4 is permitted to travel only so far until the plate 90 engages the stop 110. The stops on the main frame will be effective to prevent such extremes in wheel movement in both the working and transport conditions of the wheel assembly.

On the wing sections of the cultivator, such as is shown in FIG. 1 at 16 and 17, the transport wheel assemblies are slightly modified to eliminate the provision of the transport strap since the wing sections will be elevated or tilted up when the vehicle is transported. However, in the working condition, the transport wheel assemblies adjust relative to one another to follow on uneven terrain. The wing sections, which are hinged to the main section 16, are not always horizontally aligned with the main section due to the hinged connection therewith. Consequently, in the transport wheel assembly, it is necessary to provide a provision for adjusting the positions of the wheels in the lowered position for wing axle depth adjustment for the working tools to make sure that all of the tools distributed on the composite frame are at a uniform working depth. Thus, in FIGS. 6 and 7, there is shown fragmentary side and end elevation views of a portion of the shaft adjacent one end of the actuator. For example, as indicated in FIG. 6, the shaft shown at 130, would be the equivalent of the shaft 81 in the wheel assembly shown in FIGS. 2, 3, 4 and 5. This shaft has mounted thereon the arm 87 which mounts a wheel 58 at the end of the same and which would cooperate with a similar shaft mounting a second wheel 57 of the pair with a suitable actuator linkage therebetween. For simplicity, the details are omitted. In this embodiment, the plate member 135 which is equivalent to the plate 91 shown in FIGS. 2, 3, 4 and 5 is loosely mounted on the shaft. Suitable side plates 138 are positioned on either side thereof and are secured to the shaft 130. The flange plate 135 has the pin 136 to which either the shaft or the cylinder end of the actuator will be connected through the clevis type connections similar to 95. The plate has a slightly different configuration from the plates 90 and 91 in that the equivalent of the pins 100 and 101 are omitted. Similarly, the plate has a tongue portion 140 which extends between the fixed plates 138. The plates 138 have transversely extending upper and lower plates 142 welded thereto with a tongue portion fitting between the side plates 138 and the transversely extending plates 142, as will be best seen in FIG. 7. The plates 142 have tapped apertures therein, such as is indicated at 145, and suitable bolt means 150 are threaded into the tapped apertures in the plates 142 above and below the tongue portion 140. Lock nuts 152 are threaded on the bolts to lock the same once the desired spacing with the tongue is obtained. Thus, the plates 138 are secured to the shaft 130 and hence, the adjusting bolts carried by the plates 142 are common to the shaft. The flange plate 135, to which the actuator is connected, is loose and is driven by engagement of the tongue portion with the ends of the adjusting bolts 150. The relative positioning between the tongue and plates 138 may be adjusted for the purpose of elevating or lowering the arm 87 mounted on the shaft 130 and hence, the wheel relative thereto. Since the actuator is connected between the plates on the shafts for each pair of wheels, an adjustment of one arm is transmitted to the other. Therefore, only a single plate on one shaft of the pair will employ the adjustment to affect the level of the wheels relative to the frame for each pair. In this manner, an adjustment may be made through the transport wheel assemblies on the wing sections to adjust the wheels so that the wing sections will be aligned with the main section and the working tools thereon will be at the same depth in the working position of the implement as those tools on the main section. Once the desired adjustment is made to ensure level of the wing sections with the center section, elevation of the implement between working and transport position will be affected in the manner described and shown in connection with FIGS. 3 and 4.

It will be recognized that once the implement is placed in transport position, the wing sections may be folded and locked in which case the transport wheels on the respective wing sections will be out of engagement with the ground and will have no effect on the stability of the implement during transport. However, in the traverse of uneven terrain in the working condition of the transport wheels, the same operation will take place with the transport wheels on the wing section as with those on the center section of the implement. This is to say that upon meeting an obstruction, either a bump or depression, the wheel meeting it will follow the terrain while the trailing wheel will be displaced to compensate for this shift in position. The resulting effect will be substantially the level position of the implement and uniform depth of setting of the working tools.

Although only a single stop member is shown in connection with the transport wheel assembly, it will be recognized that a similar stop member may be placed on the other side of the opposite shaft in a pair of shafts to restrict movement of the wheels in either direction. Similarly, such arrangement of stop members may be present on all wheel assemblies including the wing sections.

The improved transport wheel assembly provides for a narrow center to center wheel dimension when the cylinder is extended for the transport positioned causing the implement frame to raise. This enables less wheel drag during sharp turns than with conventional axles which have fixed center relationships. The wide center to center wheel to center relationship when the cylinder is retracted and when the machine is operating in the ground working condition provides for greater stability to the implement at a time when it is needed, that is during field operation. The wide fore and aft wheel relationship in the working position is generally larger than can be obtained with fixed center arrangement, and this provides for less angular movement of the frame while traveling over rough terrain. The individual axle designs permit lateral spacing of the wheels of the transport assembly, and this ensures that wheel tracks can be followed by soil working tools to remove compacted areas created by the wheels. Further, this spacing results in a greater floatation in the field working position and a better distribution of the weight carrying points on the frame of the implement. The single power source will raise and lower each wheel assembly and also serves as a link to produce load distribution on each wheel as they pass over uneven terrain. It also gauges the depth of operation of the tillage tool attached to the frame section of the implement.

Therefore, in consideration of this invention it should be remembered that the present disclosure is illustrative only and the scope of the invention should be determined by the appended claims.

What I claim is:

1. A transport wheel assembly for an agricultural implement having a frame section extending transversely to the forward direction of travel of the implement with ground working tools connected to the frame section and distributed along the extent of the same, comprising: at least two pairs of ground support wheels; a pair of pivot arms for each pair of wheels; each wheel of said pair of wheels being journaled on an axle mounted on one end of a pivot arm respectively; a pair of shafts for each pair of wheels journaled in the frame section of the implement and mounting the other ends of said pivot arms respectively, the shafts for said pivot arms of each pair of wheels being mounted in the frame section so as to be spaced apart along the extent of the frame section and apart in the frame section in the forward direction of travel of the implement; and actuator means coupled to said shafts of each pair of wheels to rotate said pivot arms of each of said pairs toward and away from one another to lower the wheels relative to the frame section for transport of the implement and to raise the wheels relative to the frame section for working of the tools mounted on the frame section of the implement, said pivot arms for each pair of wheels having a length dimension at least equal to the spacing of the shafts in the forward direction on which they are mounted on the frame section, said axles being spaced apart in the forward direction approximately equal to the spacing between the shafts mounting the same for the raised position of the wheels and less than the spacing between the shafts on which they are mounted for the lowered position of the wheels.

2. The transport wheel assembly of claim 1 in which the actuator means is a single hydraulic actuator.

3. The transport wheel assembly of claim 2 in which the hydraulic actuator is connected to the shafts at the cylinder and shaft extremities of the actuator through pivot linkages.

4. The transport wheel assembly of claim 3 and including stop means positioned on the frame section and engaging one of said pivot linkages.

5. The transport wheel assembly of claim 4 in which the stop means is a bar welded to the frame section in line with and closely spaced to one of the shafts to limit movement of the pivot arms mounted on the shaft.

6. The transport wheel assembly of claim 3 and including strap means connected between the pivot linkages in the lowered position of the wheels.

7. The transport wheel assembly of claim 6 in which the pivot linkages have pin means thereon and the strap means have apertures which fit over the pins on the pivot linkages to hold the same in a fixed relative position.

8. The transport wheel assembly of claim 3 in which one of the pivot linkages includes an adjustable lug for adjusting the position of the pivot arm associated therewith and hence the wheels relative to the implement frame section.

9. The transport wheel assembly of claim 8 in which the adjustable lug includes a pair of plates connected to one of the shafts and the pivot linkage is loosely mounted on the said one of the shafts with adjustable bolt means threaded through flanges connected to the plates to engage a tongue on the pivot linkage and transmit motion of the plates to the pivot linkage and to the pivot arm and actuator.

10. The transport wheel assembly of claim 1 in which the actuator means for pairs of ground supporting wheels are connected together for simultaneous operation in the same direction of pivot of said shafts.

11. The transport wheel assembly of claim 1 in which the spacing between the wheels of each pair along the extent of the frame section is greater than the spacing between the wheel axles in the lowered position of the wheels.

12. The transport wheel assembly of claim 1 in which motion from one wheel of the pair is transmitted to the other wheel of the pair through the actuator means.

* * * * *

UNITED STATES PATENT AND TRADEMARK OFFICE
CERTIFICATE OF CORRECTION

PATENT NO. : 4,139,065
DATED : February 13, 1979
INVENTOR(S) : Howard L. Lewison It is certified that error appears in the above-identified patent and that said Letters Patent are hereby corrected as shown below:

Column 7, line 12, delete "to center" (second occurrence)

Signed and Sealed this

Twelfth Day of June 1979

[SEAL]

Attest:

RUTH C. MASON
Attesting Officer

DONALD W. BANNER
Commissioner of Patents and Trademarks